United States Patent [19]

Lee et al.

[11] 4,036,552
[45] July 19, 1977

[54] RETROREFLECTIVE MATERIAL MADE BY RECORDING A PLURALITY OF LIGHT INTERFERENCE FRINGE PATTERNS

[75] Inventors: Pui Kum Lee, White Bear Lake; Wolfgang H. Strehlow, Woodbury, both of Minn.

[73] Assignee: Minnesota Mining and Manufacturing Company, St. Paul, Minn.

[21] Appl. No.: 548,439

[22] Filed: Feb. 10, 1975

[51] Int. Cl.² ............................................. G02B 5/12
[52] U.S. Cl. ....................................... 350/97; 350/3.5; 350/162 ZP
[58] Field of Search ................. 350/97, 3.5, 165, 103, 350/104, 162 ZP; 264/1, 2

[56] References Cited

U.S. PATENT DOCUMENTS

| | | | |
|---|---|---|---|
| 3,575,629 | 4/1971 | O'Keeffe | 350/162 ZP |
| 3,614,193 | 10/1971 | Berser | 350/162 ZP |
| 3,675,990 | 7/1972 | Kogelnik et al. | 350/3.2 |
| 3,735,278 | 5/1973 | Schafer et al. | 350/162 ZP |
| 3,794,426 | 2/1974 | Mueller et al. | 350/162 ZP |

*Primary Examiner*—John K. Corbin
*Assistant Examiner*—B. W. delos Reyes
*Attorney, Agent, or Firm*—Cruzan Alexander; Donald M. Sell; William B. Barte

[57] ABSTRACT

Retroreflective material including a medium containing a plurality of diffraction elements comprising light interference fringe patterns for enabling provision of a retroreflective effect upon light incident thereon. In making one embodiment a plurality of light interference fringe patterns defining an array of phase modulated fresnel zone plates is replicated by embossing at one surface of a copy medium having a thickness equal to a given focal length associated with the fresnel zone plates and a reflective material is coated on the opposite surface of the copy medium. In making other embodiments a plurality of fringe patterns is recorded throughout the volume of a photosensitive medium.

1 Claim, 10 Drawing Figures

4,036,552

RETROREFLECTIVE MATERIAL MADE BY RECORDING A PLURALITY OF LIGHT INTERFERENCE FRINGE PATTERNS

BACKGROUND OF THE INVENTION

1. Field of the Invention

The present invention pertains to retroreflective material and to methods of manufacturing such material. A retroreflective material is a material that returns or directs most of an incident light beam back toward the light source in a cone having a small angle, even though the incident light strikes at an angle. This is known as a retroreflective effect.

2. Description of the Prior Art

In prior art retroreflective materials, a retroreflective effect is provided by a variety of optical elements including glass beads, cube corners and lenslet arrays. The glass beads are coated on a substrate; the cube corners are typically embossed in plastic sheet material; and the array of lenslets is spaced from a reflective surface positioned in the back focal plane of the lenslets.

SUMMARY OF THE INVENTION

The present invention is a retroreflective material including a transparent medium having at one surface thereof a plurality of diffraction elements defining an array of fresnal zone plates, each of which diffraction elements represent a light interference fringe pattern. The medium has a thickness equal to a given focal length associated with the fresnel zone plates and has a reflective material on an opposite surface in the back focal plane of the fresnel zone plates defined by that given focal length, thus enabling the continuous retroreflection of light incident at any point on the first surface. In a preferred embodiment, the retroreflective material is prepared by first recording a single such diffraction element in a photosensitive medium by interferring two light beams derived from the same coherent light source. After each diffraction element is so recorded, the position of the photosensitive medium is changed with respect to the recording means and the recording step is repeated to provide a plurality of such diffraction elements in the photosensitive medium.

In such an embodiment, the recorded plurality of light interference fringe patterns define an array of images of a fresnel zone plate in the photosensitive medium. This photosensitive medium is then developed to provide an array of fresnel zone plates and is used to make a stamper for embossing diffraction elements defining an array of phase modulated fresnel zone plates corresponding to the array of fresnel zone plates in the developed photosensitive medium. The phase modulated fresnel zone plates have a given focal length associated therewith.

The stamper is used to emboss transparent copy media to readily and simply mass replicate an array of phase modulated fresnel zone plates at one surface of each copy medium. These arrays are embossed in copy media that is of a thickness equal to the given focal length associated with such fresnel zone plates; and a reflective material is coated on the opposite surface of each copy medium in the back focal plane of the fresnel zone plates to provide retroreflective material of the present invention.

In other embodiments decribed herein a retroreflective effect is provided by the diffraction elements of the retroreflective material without having to provide a reflective coating thereto.

DESCRIPTION OF THE PREFERRED EMBODIMENTS

Figure 1:
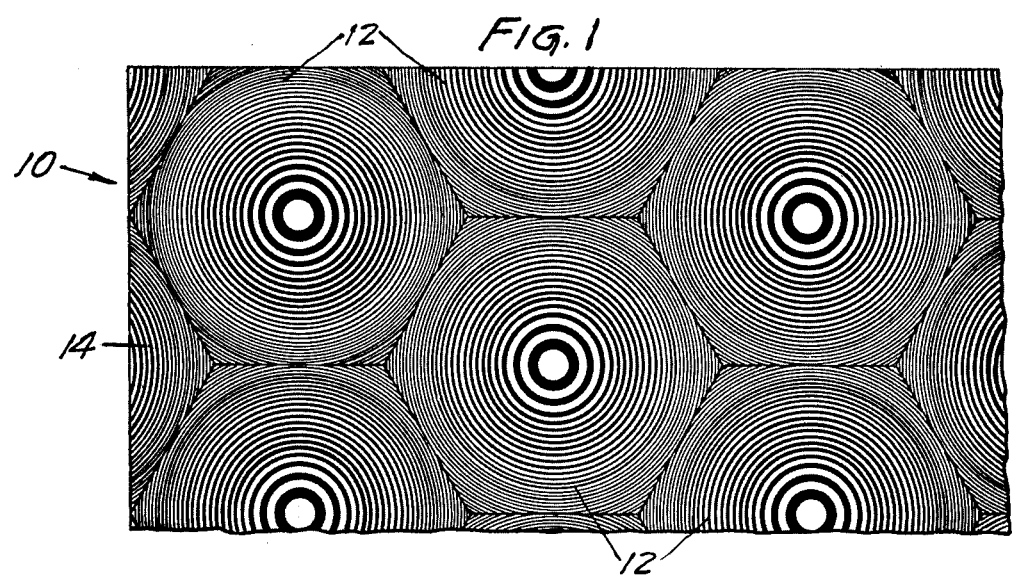
FIG. 1 is a schematic illustration of an enlarged cut away section of retroreflective material including an array of diffraction elements according to one preferred embodiment of the present invention.
Figure 1A:
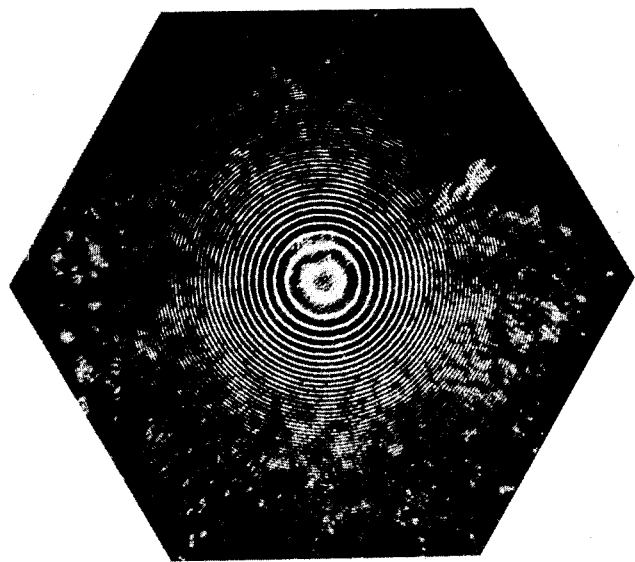
FIG. 1A is a photolithograph showing the general appearance of a single diffraction element of the array illustrated in FIG. 1.

FIG. 1 illustrates the general appearance of retroreflective material 10 according to one embodiment of the present invention. The retroreflective material 10 comprises a plurality of identical hexagonal shaped diffraction elements 12 uniformly positioned in an array over a broad planar surface 14 of the material 10. FIG. 1A is a photolithograph providing an enlarged view of a single diffraction element of the retroreflective material 10. Both FIGS. 1 and 1A show amplitude modulated fresnel zone plates to better illustrate the light interference fringe patterns of the diffraction elements. As will be described hereinafter with reference to FIGS. 5, 6 and 7, phase modulated fresnel zone plates are actually preferred in the practice of this embodiment of the present invention.

Each diffraction element 12 is recorded separately by interfering two light beams derived from the same coherent light source. In accordance with different preferred embodiments for making the present invention, three different combinations of light beams are used, i.e. both beams are converging, both are collimated, or one is converging and the other is collimated.

Figure 2:
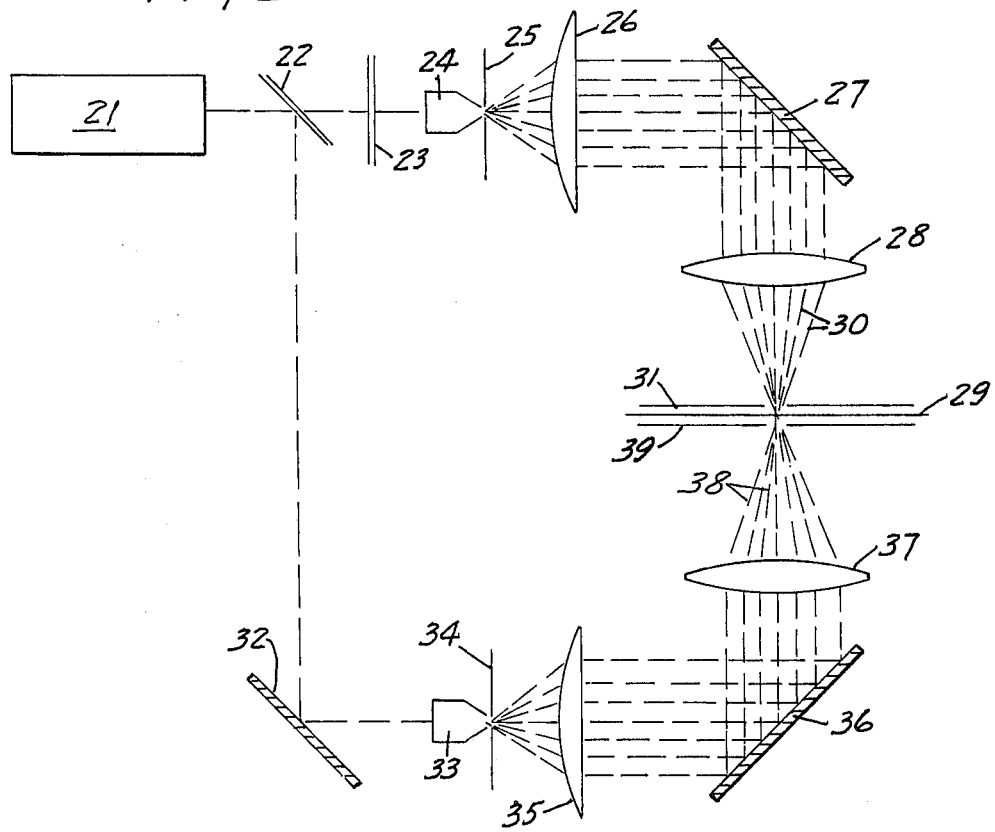
FIG. 2 schematically illustrates one embodiment of a system for recording interference fringe patterns with two converging light beams used in making retroreflective material.

FIG. 2 illustrates one system for recording a diffraction element by interfering two converging light beams from a common coherent light source. This recording system comprises a laser 21 for producing a collimated coherent light beam, a beam splitter 22, a neutral density filter 23, a microscope objective lens 24 and a pin hole aperture plate 25 for providing a first diverging beam emanating from substantially a point source, lens 26 for providing a collimated beam, mirror 27 for reflecting this collimated beam, a lens 28 for focusing to form a first converging light beam 30 directed toward the recording medium 29, an aperture plate 31 for defining the area of the recording medium 29 within which the diffraction element is to be recorded, a mirror 32 for reflecting a second beam toward the recording medium 29, a microscope objective lens 33 and a pin hole aperture plate 34 for providing a second diverging beam emanating from substantially a point source, a lens 35 for providing a collimated beam, a mirror 36 for reflecting this collimated beam, a lens 37 for focusing to form a second converging light beam 38 directed toward the recording medium 29, and a plate 39 for defining the same area of the recording medium 29 as is defined by the aperture plate 31. The ratio of the intensity of the two converging beams 30 and 38 may be adjusted by selecting the appropriate density filter 23. By adjusting this ratio, appropriate contrast between the fringes and thereby a greater retroreflective effect is obtained.

Figure 3:
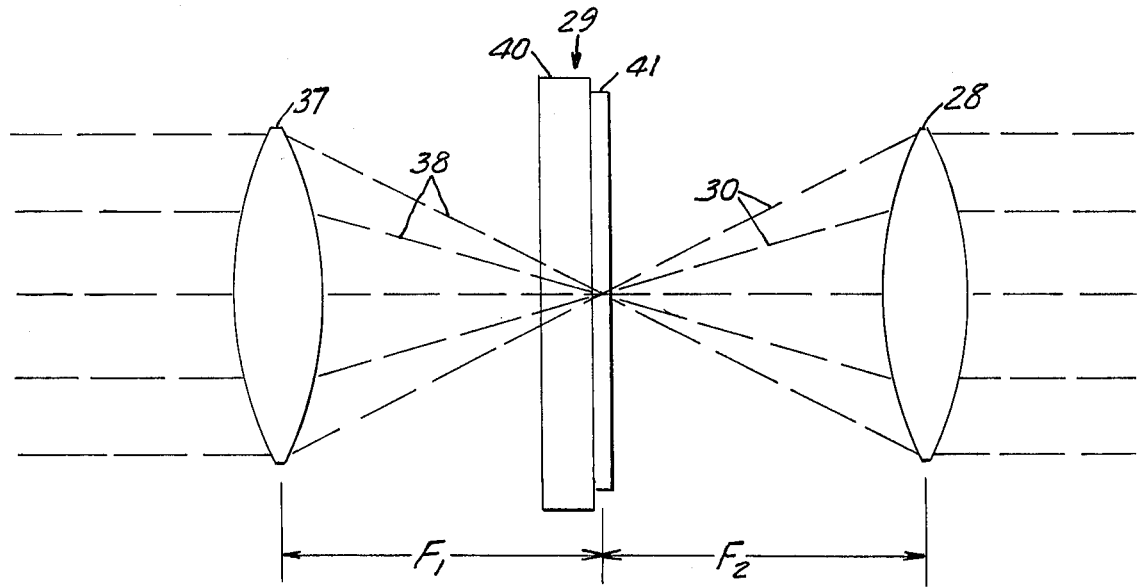
FIG. 3 schematically illustrates a photosensitive medium used in recording light interference fringe patterns with the system of FIG. 2.

Referring to FIG. 3, the recording medium 29 preferably is a glass plate 40 having a photosensitive medium 41 on one surface thereof. The photosensitive medium 41 preferably is thick, such as is used when recording volume holograms. A preferred photosensitive medium 41 is Eastman Kodak's spectroscopic plate type 649F which is available in emulsion thicknesses of 17 μm and 35 μm.

In the embodiment shown in FIG. 3, the converging beams 30 and 38 are coaxial and are so focused that their apexes meet at a common point substantially in the middle of the photosensitive medium 41. Preferably the focal length $F_1$ of the lens 37 equals the focal length $F_2$ of the lens 28.

Figure 4:
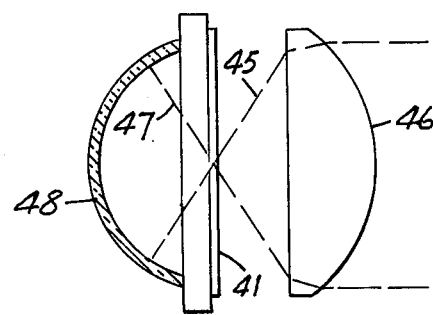
FIG. 4 schematically illustrates portions of an alternative embodiment for recording light interference fringe patterns with two converging light beams used in making retroreflective material.

In another embodiment, the system of FIG. 2 may be modified, as shown in part of FIG. 4, such that one converging beam 45 is focused to the photosensitive medium 41 by a lens 46 positioned on one side of the photosensitive medium 41 and the other converging beam 47 is provided by reflecting with a spherical reflector 48 positioned on the opposite side of the photosensitive medium 41, a portion of the beam 45 that is transmitted through the photosensitive medium 41. In this embodiment too, a thick photosensitive medium 41, such as the Eastman Kodak type 649F emulsion is used.

It is important that the spherical reflector 48 be highly reflective in order to provide a beam 47 having an intensity comparable to that of the beam 45.

The plurality of diffraction elements recorded according to the foregoing methods described with reference to FIGS. 2, 3 and 4 provide a retroreflective effect without having a reflective surface combined therewith.

Figure 5:
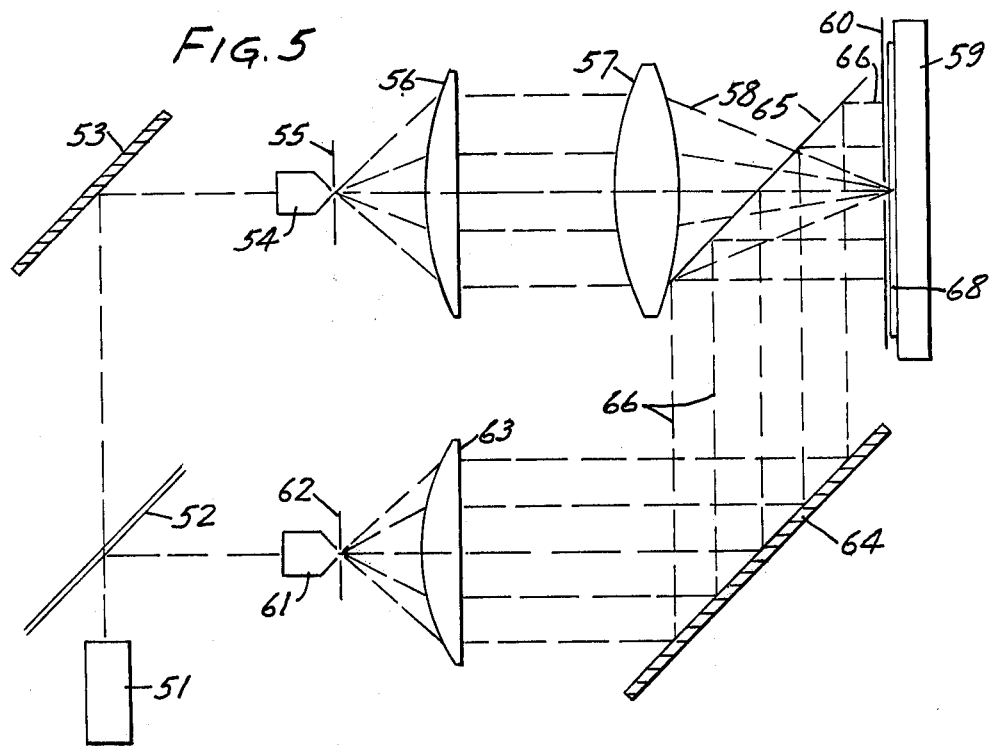
FIG. 5 schematically illustrates an embodiment of a system for recording interference fringe patterns with a converging light beam and a collimated light beam used in making retroreflective material according to the present invention.
Figure 6:
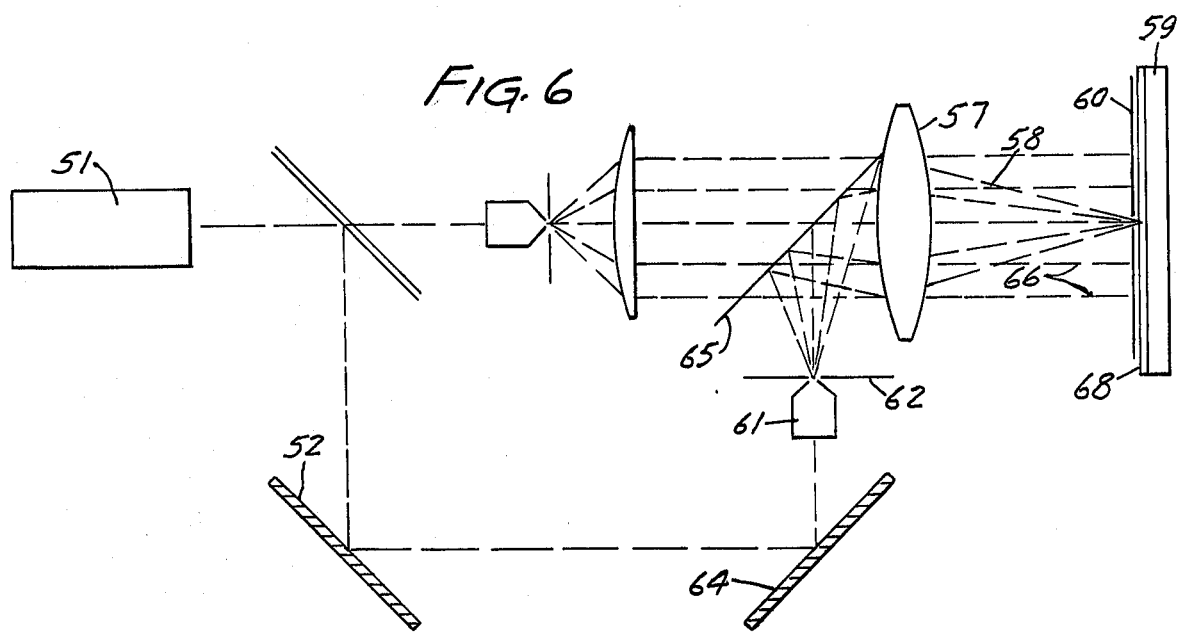
FIG. 6 schematically illustrates an alternative embodiment of the system of FIG. 5.

FIGS. 5 and 6 illustrate two embodiments of a system for recording a diffraction element by interfering a collimated first light beam with a converging second light beam. The light interference fringe patterns of the diffraction elements recorded with this system define an array of amplitude modulated fresnel zone plates. The diffraction elements that are replicated with a stamper derived from the recorded fresnel zone plates define phase modulated fresnel zone plates which have a given focal length associated therewith, and by themselves provide only a focusing effect, whereby they must be combined with a reflective material coated throughout the back focal plane of such fresnel zone plates to provide a retroreflective effect.

Referring to FIG. 5, this system comprises a laser 51 for producing a collimated coherent light beam, a beam splitter 52, a mirror 53, a microscopic objective lens 54 and a pin hole aperture plate 55 for providing a first diverging beam emanating from substantially a point source, a lens 56 for providing a collimated beam, a lens 57 for focusing to form a converging light beam 58 directed toward a recording medium 59, an aperture plate 60 for defining the area of the recording medium 59 within which the diffraction element is to be recorded, a microscope objective lens 61 and a pin hole aperture plate 62 for providing a second diverging beam emanating from substantially a point source, a lens 63 for providing a collimated beam and a mirror 64 and a beam splitter 65 for directing a collimated beam 66 toward the recording medium 59. The beam 66 is coaxial with the beam 58. The aperture of the aperture plate 60 is hexagonal in order to enable recording of a tightly packed array of diffraction elements 12, as shown in FIG. 1.

The system of FIG. 6 differs from that of FIG. 5 in that the lens 57 focuses to form not only the converging beam 58 but also the collimated beam 66, and in that the beam splitter 65 is no longer placed between the lens 57 and the recording medium 59, but is instead placed on the opposite side of the lens 57 from the recording medium 59. The distance between the point source 62 and the lens 57 is equal to the distance between the recording medium 59 and the lens 57.

Using either the system of FIG. 5 or the system of FIG. 6 an array of diffraction elements is recorded in a photosensitive medium 68 of the recording medium 59. The photosensitive medium 68 preferably is thin, such as is used when recording surface holograms as opposed to volume holograms.

Preferred photosensitive media 68 for the recording medium 59 include silver halide emulsion. However, because the developed image of the silver halide emulsion generally does not provide enough surface relief, it cannot be used as a master in making the stamper; and the images recorded therein have to be copied therefrom onto some other photosensitive material which will provide surface relief images due to changes in thickness. Such a material is a photopolymer manufactured by the Horizon Corporation called Photoresist L108. Although the Horizon photopolymer can be used as the photosensitive medium 68 in the first place, it is not preferred as such because it is less sensitive than the silver halide emulsion. Thus the amplitude modulated fresnel zone plates recorded on the silver halide emulsion are converted to phase-modulated fresnel zone plates with surface relief and an embossing stamper is made, by techniques which are well known to those who are skilled in the pertinent art.

The stamper is used for embossing a transparent plastic copy medium to provide an array of phase modulated fresnel zone plates at one surface thereof.

Figure 7:
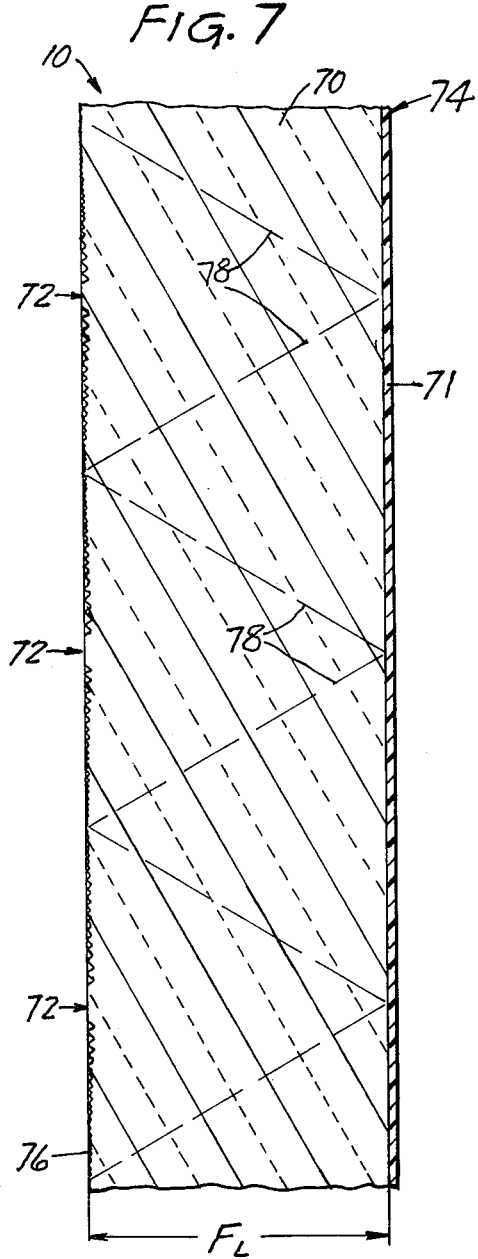
FIG. 7 schematically illustrates an edge view of a retroreflective material of the present invention made from the recording of diffraction elements made with the system of either of FIGS. 5 or 6.

Referring to FIG. 7, the copy medium 70 is of a thickness equal to the given focal length $F_L$ associated with the fresnel zone plates 72. A reflective material 71, such as silver or aluminum, is coated by vapor deposition onto the surface 74 of the copy medium 70 opposite to the embossed surface 76 thereof defining the fresnel zone plates 72. The given focal length $F_L$ is actually the effective focal length which is dependent upon the refractive index of the material used for the copy medium 70. The lines 78 in FIG. 7 represent the focusing effect provided by the fresnel zone plates 72.

For the retroreflective material 10 of FIG. 7, retroreflection occurs for only those light beams that are incident to fresnel zone plates 72 of the array within cones around the axes of such fresnel zone plates. The cone angle is a function of the fresnel zone plate parameters, and a small f-number is desirable in order to obtain a large cone angle. A small f-number also increases the fraction of the incident light that is retroreflected.

Figure 8A:
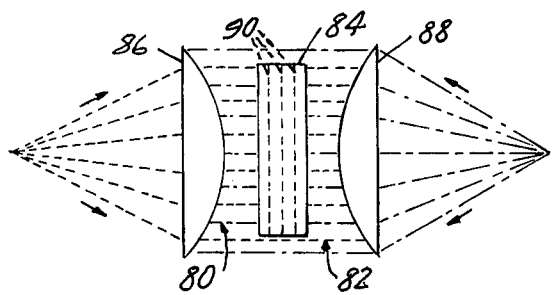
FIGS. 8A and 8B schematically illustrate repetitive recording steps in a portion of a system for recording light interference fringe patterns with anti-parallel first and second collimated light beams used in making retroreflective material.
Figure 8B:
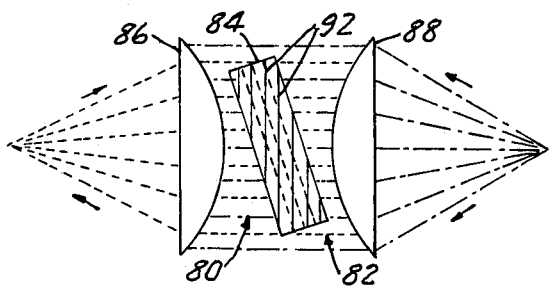

FIGS. 8A and 8B schematically illustrate recording a diffraction element of light interference fringe patterns by interfering two antiparallel collimated light beams 80 and 82 derived from a common coherent light source. The beams 80 and 82 are interferred with one another to provide an interference fringe pattern in a photosensitive medium 84 placed between lenses 86 and 88. The interfering beams 80 and 82 cover the entire medium 84. After a first set of fringe patterns 90 is recorded (FIG. 8A), the holder (not shown) containing the medium 84 is tilted to a new position and the recording step is repeated (FIG. 8B) to record another set of fringe patterns 92.

The recording procedure is repeated at a plurality of uniformly spaced elevations with respect to the recording means (represented by lenses 86 and 88) and at a plurality of uniformly spaced azimuth angles throughout 360° with respect to the recording means to provide a plurality of interference fringe patterns throughout the volume of the photosensitive medium 84. It is preferred that the azimuth angles be spaced at intervals of 2°, and that the elevation angles be spaced at intervals of 2° through an arc of 40°. This arc extends between the normal to the large surface of photosensitive medium 84 and the direction of the collimated beams 80 and 82.

The photosensitive medium 84 must be thick such as is used when recording volume holograms. In addition to the Eastman Kodak type 649F emulsion mentioned above, other suitable photosensitive media 84 include such photochromic materials as certain alkali halides, lithium niobate and barium sodium niobate.

Since this recording is essentially a volume hologram, copies cannot be made by the replication technique described above. However, the volume diffraction elements made by the method illustrated in FIGS. 8A and 8B does advantageously comprise fringe patterns 90, 92, . . . that simultaneously cover the entire area of the photosensitive medium to thereby retroreflect light from all orientations corresponding to the tilt angles used during the recording process.

What is claimed is:

1. A retroreflective material comprising a transparent medium having at one surface thereof a plurality of diffraction elements defining an array of fresnel zone plates each of which diffraction elements represent a light interference fringe pattern, said medium having a thickness equal to a given focal length associated with the fresnel zone plates and having a reflective material on an opposite surface in the back focal plane of the fresnel zone plates defined by said given focal length, to enable the continuous retroreflection of light incident at any point of said one surface.

* * * * *